(12) United States Patent
Tsubaki et al.

(10) Patent No.: US 11,935,704 B2
(45) Date of Patent: *Mar. 19, 2024

(54) ELECTROLYTIC CAPACITOR COMPRISING AN ELECTROLYTIC SOLUTION CONTAINING A FIRST BASE COMPONENT, A FIRST ACID COMPONENT, AND A SECOND ACID COMPONENT

(71) Applicant: Panasonic Intellectual Property Management Co., Ltd., Osaka (JP)

(72) Inventors: Yuichiro Tsubaki, Kyoto (JP); Kazuyo Saito, Osaka (JP); Tatsuji Aoyama, Kyoto (JP)

(73) Assignee: PANASONIC INTELLECTUAL PROPERTY MANAGEMENT CO., LTD., Osaka (JP)

( * ) Notice: Subject to any disclaimer, the term of this patent is extended or adjusted under 35 U.S.C. 154(b) by 0 days.

This patent is subject to a terminal disclaimer.

(21) Appl. No.: 17/884,290

(22) Filed: Aug. 9, 2022

(65) Prior Publication Data

US 2022/0392713 A1 Dec. 8, 2022

Related U.S. Application Data

(63) Continuation of application No. 17/080,932, filed on Oct. 27, 2020, now Pat. No. 11,443,901, which is a
(Continued)

(30) Foreign Application Priority Data

May 21, 2018 (JP) ................................ 2018-096710

(51) Int. Cl.
*H01G 9/035* (2006.01)
*H01G 9/028* (2006.01)
*H01G 9/15* (2006.01)

(52) U.S. Cl.
CPC ............. *H01G 9/028* (2013.01); *H01G 9/035* (2013.01); *H01G 9/15* (2013.01)

(58) Field of Classification Search
CPC ............ H01G 9/15; H01G 9/07; H01G 9/035; H01G 9/032; H01G 9/028
See application file for complete search history.

(56) References Cited

U.S. PATENT DOCUMENTS 6,307,735 B1    10/2001  Saito et al.
11,443,901 B2 *  9/2022  Tsubaki ................. H01G 9/035
(Continued)

FOREIGN PATENT DOCUMENTS

JP    2008-098494    4/2008
JP    2008-177197    7/2008
(Continued)

OTHER PUBLICATIONS

International Search Report of PCT application No. PCT/JP2019/019822 dated Aug. 6, 2019.
(Continued)

*Primary Examiner* — David M Sinclair
(74) *Attorney, Agent, or Firm* — Rimon P.C.

(57) ABSTRACT

An electrolytic capacitor includes an anode body having a dielectric layer disposed on a surface of the anode body, a solid electrolyte layer that is in contact with the dielectric layer, and an electrolytic solution. The solid electrolyte layer includes a conductive polymer. The electrolytic solution contains a first base component, a first acid component, and a second acid component. The first base component includes an amidine compound. The first acid component includes a composite compound of an inorganic acid and an organic acid. The second acid component includes at least one
(Continued)

selected from a group consisting of boric acid, phosphoric acid, phosphorous acid, hypophosphorous acid, and phosphonic acid.

15 Claims, 1 Drawing Sheet

Related U.S. Application Data continuation of application No. PCT/JP2019/019822, filed on May 20, 2019.

(56) References Cited

U.S. PATENT DOCUMENTS

| | | | |
|---|---|---|---|
| 2008/0316679 A1 | 12/2008 | Sugihara et al. | |
| 2009/0144954 A1 | 6/2009 | Furusawa et al. | |
| 2015/0077900 A1* | 3/2015 | Petrzilek | H01G 9/06 29/25.03 |
| 2015/0235773 A1* | 8/2015 | Takeuchi | H01G 9/02 252/62.2 |
| 2015/0287540 A1 | 10/2015 | Koseki et al. | |
| 2016/0336117 A1 | 11/2016 | Koseki et al. | |
| 2017/0133159 A1 | 5/2017 | Aoyama et al. | |
| 2018/0233292 A1 | 8/2018 | Tsubaki et al. | |
| 2019/0013152 A1 | 1/2019 | Aoyama et al. | |

FOREIGN PATENT DOCUMENTS

| | | |
|---|---|---|
| JP | 2015-165550 | 9/2015 |
| WO | 2017/073062 A1 | 5/2017 |
| WO | 2017/163727 | 9/2017 |

OTHER PUBLICATIONS

Non-Final Office Action dated Sep. 16, 2021 issued in U.S. Appl. No. 17/080,932.

Final Office Action dated Feb. 8, 2022 issued in U.S. Appl. No. 17/080,932.

Notice of Allowance dated May 19, 2022 issued in U.S. Appl. No. 17/080,932.

* cited by examiner

ELECTROLYTIC CAPACITOR COMPRISING AN ELECTROLYTIC SOLUTION CONTAINING A FIRST BASE COMPONENT, A FIRST ACID COMPONENT, AND A SECOND ACID COMPONENT

RELATED APPLICATIONS

This application is a continuation of U.S. patent application Ser. No. 17/080,932, filed on Oct. 27, 2020, which is a continuation of International Patent Application No. PCT/JP2019/019822, filed on May 20, 2019, which claims the benefit of foreign priority of Japanese patent application No. 2018-096710 filed on May 21, 2018, the contents all of which are incorporated herein by reference.

BACKGROUND

1. Technical Field

The present disclosure relates to an electrolytic capacitor including a solid electrolyte layer containing a conductive polymer.

2. Description of the Related Art

As a small-sized, large-capacitance capacitor having a low equivalent series resistance (ESR), an electrolytic capacitor is seen as promising, the electrolytic capacitor including an anode body having a dielectric layer formed thereon and a solid electrolyte layer formed to cover at least a part of the dielectric layer.

Unexamined Japanese Patent Publication No. 2015-165550 discloses that an electrolytic solution contains an ammonium salt and a composite compound of an inorganic acid and an organic acid as solutes in order to improve the withstand voltage of the electrolytic capacitor.

SUMMARY

An electrolytic capacitor according to an aspect of the present disclosure includes an anode body having a dielectric layer disposed on a surface of the anode body, a solid electrolyte layer that is in contact with the dielectric layer, and an electrolytic solution. The solid electrolyte layer includes a conductive polymer. The electrolytic solution contains a first base component, a first acid component, and a second acid component. The first base component includes an amidine compound. The first acid component includes a composite compound of an inorganic acid and an organic acid. The second acid component includes at least one selected from the group consisting of boric acid, phosphoric acid, phosphorous acid, hypophosphorous acid, and phosphonic acid.

According to the present disclosure, an electrolytic capacitor excellent in reliability can be provided.

DETAILED DESCRIPTION OF EMBODIMENT

Unexamined Japanese Patent Publication No. 2015-165550 proposes that as the solutes of the electrolytic solution, the electrolytic solution contains an ammonium salt and a composite compound of an inorganic acid and an organic acid.

However, in the electrolytic capacitor described in Unexamined Japanese Patent Publication No. 2015-165550, there is a possibility that the electrolytic solution may deteriorate, and a leakage current may increase because the recoverability of the dielectric layer of the electrolytic capacitor cannot be maintained.

Hereinafter, the present disclosure will be described more specifically based on an exemplary embodiment. However, the following exemplary embodiment does not limit the present disclosure.

Figure 1:
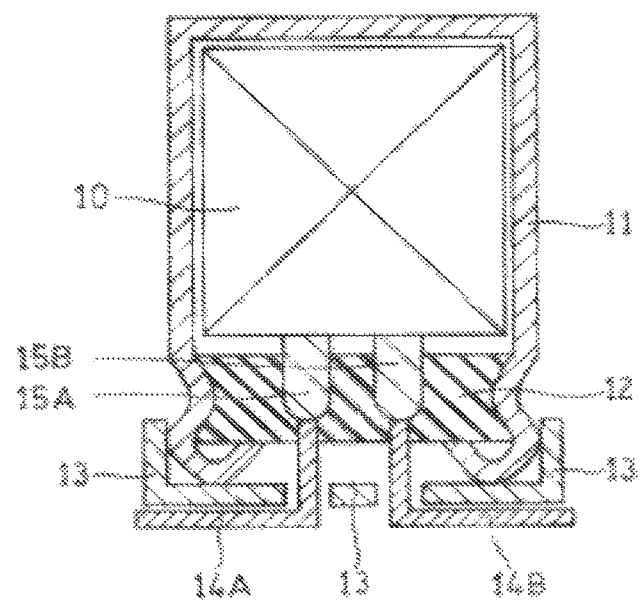
FIG. 1 is a schematic cross-sectional view illustrating an electrolytic capacitor according to an exemplary embodiment of the present disclosure.
Figure 2:
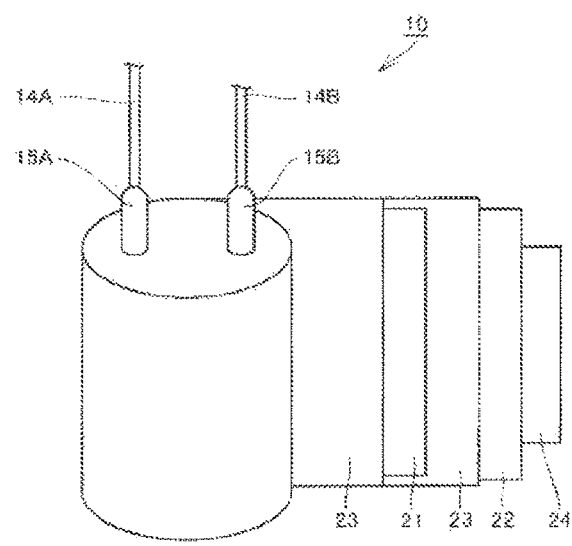
FIG. 2 is a schematic view for explaining a configuration of a capacitor element according to the exemplary embodiment.

FIG. 1 is a schematic cross-sectional view illustrating an electrolytic capacitor according to the present exemplary embodiment, and FIG. 2 is a schematic view in which a part of a capacitor element of the electrolytic capacitor is developed.

The electrolytic capacitor includes, for example, capacitor element 10, bottomed case 11 that houses capacitor element 10, sealing member 12 that closes an opening of bottomed case 11, seat plate 13 that covers sealing member 12, lead wires 14A, 14B, lead tabs 15A, 15B, and an electrolyte (not shown). Lead wires 14A, 14B are drawn out from sealing member 12 and penetrate seat plate 13. Lead tabs 15A, 15B connect the lead wires and the electrodes of capacitor element 10. And the electrolyte contains an electrolytic solution and a solid electrolyte. The vicinity of the opening end of bottomed case 11 is drawn inward, and the opening end is curled to swage sealing member 12.

Capacitor element 10 is formed from a wound body as shown in FIG. 2. The wound body includes anode body 21 connected to lead tab 15A, cathode body 22 connected to lead tab 15B, and separator 23. The wound body is a semi-finished product in which the solid electrolyte layer is not formed between anode body 21 and cathode body 22.

Anode body 21 and cathode body 22 are wound with separator 23 interposed therebetween. The outermost circumference of the wound body is fixed with winding stop tape 24. Note that FIG. 2 shows a state in which a part of the wound body is developed before the outermost circumference of the wound body is stopped. As a material of separator 23, for example, a nonwoven fabric containing, as a main component, cellulose, polyethylene terephthalate, vinylon, aramid fiber, or the like can be used.

Anode body 21 includes a metal foil whose surface is roughened to have irregularities, and a dielectric layer is formed on the metal foil having irregularities. The solid electrolyte layer is formed by attaching a conductive polymer to at least a part of the surface of the dielectric layer. The solid electrolyte layer may cover at least a part of the surface of cathode body 22 and/or the surface of separator 23. Capacitor element 10 in which the solid electrolyte layer is formed is housed in bottomed case 11 together with the electrolytic solution.

The conductive polymer included in the solid electrolyte layer is a π-conjugated conductive polymer, and polypyrrole, polythiophene, polyaniline, etc., are preferable. In the present description, polypyrrole, polythiophene, polyaniline, etc., mean polymers having a basic skeleton of polypyrrole, polythiophene, polyaniline, etc., respectively. Thus, polypyrrole, polythiophene, polyaniline, etc., may include their respective derivatives. Polythiophene includes, for example, poly(3,4-ethylenedioxythiophene) (PEDOT), etc., that are derivatives of polythiophene. These may be used alone, two or more types may be used in combination, or a copolymer of two or more types of monomers may be used.

The weight average molecular weight of the conductive polymer is not particularly limited, but is, for example, ranges from 1000 to 100,000, inclusive. The solid electrolyte layer may further include a dopant.

The electrolytic solution of the present exemplary embodiment contains a solvent, a first base component, a first acid component, and a second acid component.

It is preferable that the solvent includes a glycol compound. Examples of the glycol compound include, for example, alkylene glycol and polyalkylene glycol having a weight average molecular weight less than or equal to 300. More specifically, examples of the glycol compound include ethylene glycol, propylene glycol, butylene glycol, pentylene glycol, hexylene glycol, diethylene glycol, triethylene glycol, tetraethylene glycol, pentaethylene glycol, hexaethylene glycol, etc. These may be used alone or in combination of two or more types. In particular, ethylene glycol, propylene glycol, butylene glycol (butanediol), pentylene glycol (pentanediol), etc., have a low viscosity even among glycol compounds having a weight average molecular weight less than or equal to 300, so that a solute is easily dissolved, thermal conductivity is high, and the heat dissipation when a ripple current is generated is excellent. Hence, heat resistance can be improved. In particular, ethylene glycol has a large effect of improving heat resistance.

The solvent may further contain a sulfone compound. The sulfone compound is an organic compound having in its molecule a sulfonyl group (—$SO_2$—). Examples of the sulfone compound include, for example, chain sulfone and cyclic sulfone. Examples of the chain sulfone include, for example, dimethyl sulfone, diethyl sulfone, dipropyl sulfone, and diphenyl sulfone. Examples of the cyclic sulfone include, for example, sulfolane, 3-methylsulfolane, 3,4-dimethylsulfolane, and 3,4-diphenylmethylsulfolane. In particular, it is preferable that the sulfone compound is sulfolane from the viewpoints of dissociation of solute and thermal stability. Since sulfolane has a low viscosity among sulfone compounds, it easily dissolves a solute.

Examples of other components of the solvent include, for example, a lactone compound and a carbonate compound. Examples of the lactone compound include, for example, γ-butyrolactone (GBL) and γ-valerolactone. Examples of the carbonate compound include, for example, dimethyl carbonate (DMC), diethyl carbonate (DEC), ethylmethyl carbonate (EMC), ethylene carbonate (EC), propylene carbonate (PC), and fluoroethylene carbonate (FEC). These may be used alone or in combination of two or more types. In particular, the other component is preferably a lactone compound, and more preferably GBL, from the viewpoint of thermal stability.

The first base component includes an amidine compound. The amidine compound is a compound having an alkyl-substituted amidine group, and examples thereof include, for example, a cyclic amidine compound or a quaternary compound thereof (amidinium compound). Specific examples thereof include an imidazoline compound, imidazole compound, benzimidazole compound, alicyclic pyrimidine compound, etc., which are quaternized with an alkyl group or an arylalkyl group each having 1 to 11 carbon atoms. More specifically, examples thereof include 1-methyl-1,8-diazabicyclo[5,4,0]undecene-7, 1-methyl-1,5-diazabicyclo[4,3,0]nonene-5, 1,2,3-trimethylimidazolinium, 1,2,3,4-tetramethylimidazolinium, 1,3-dimethyl-2-ethyl-imidazolinium, 1,3,4-trimethyl-2-ethylimidazolinium, 1,3-dimethyl-2-heptylimidazolinium, 1,3-dimethyl-2-(-3'heptyl) imidazolinium, 1,3-dimethyl-2-dodecylimidazolinium, 1,2,3-trimethyl-1,4, 5,6-tetrahydropyrimidium, 1,3-dimethylimidazolium, 1,3-dimethylbenzimidazolium, etc.

The first acid component contains a composite compound of an organic acid and an inorganic acid. As the composite compound of an organic acid and an inorganic acid, borodisalicylic acid, borodioxalic acid, borodiglycolic acid, etc., which have high heat resistance, are preferable.

The second acid component includes at least one selected from the group consisting of boric acid, phosphoric acid, phosphorous acid, hypophosphorous acid, and phosphonic acid. The second acid component may be esterified. For example, an example of the esterified product of the second acid component includes a condensate obtained by condensing a part of the hydroxyl groups of the second acid component with an alcohol compound, a glycol compound, or the like.

The electrolytic solution containing the composite compound of an organic acid and an inorganic acid as the first acid component is likely to have a high acidity. Meanwhile, in the present exemplary embodiment, a pH of the electrolytic solution does not become too low because the electrolytic solution contains an amidine compound, which has a higher basicity than an amine compound such as a primary amine compound, a secondary amine compound, or a tertiary amine compound, as the first base component. Thus, corrosion of the anode body can be suppressed, and the reliability of the electrolytic capacitor can be enhanced.

Further, by containing the second acid component in the electrolytic solution, decomposition of the first acid component can be suppressed. Thus, in the electrolytic capacitor in which the solid electrolyte layer including the conductive polymer is in contact with the dielectric layer, deterioration of the electrolytic solution can be suppressed. Hence, recoverability of the dielectric layer is maintained even when used for a long time, thereby suppressing an increase in a leakage current. From the viewpoint of suppressing decomposition of the first acid component, it is preferable that the second acid component is boric acid. The second acid component may be esterified in the electrolytic solution.

In the electrolytic solution, a content proportion of a total amount of the first base component and the first acid component preferably ranges from 5 wt % to 35 wt %, inclusive, and more preferably from 5 wt % to 30 wt %, inclusive. By setting it to be within this range, sufficient electric conductivity of the electrolytic solution can be obtained and the recoverability of the dielectric layer can be enhanced, in the electrolytic capacitor in which the solid electrolyte layer including the conductive polymer is in contact with the dielectric layer.

In the electrolytic solution, a content proportion of an amount of the second acid component preferably ranges from 0.1 wt % to 15 wt %, inclusive. By setting it to be more than or equal to 0.1 wt %, decomposition of the first acid component can be further suppressed. By setting it to be less than or equal to 15 wt %, precipitation of the second acid component in the electrolytic solution can be suppressed.

The electrolytic solution may further contain a second base component. Examples of the secondary base component include a primary amine compound, secondary amine compound, tertiary amine compound, and quaternary ammonium compound. Examples of the primary amine include methylamine, ethylamine, propylamine, etc., examples of the secondary amine include dimethylamine, diethylamine, ethylmethylamine, dibutylamine, etc., and examples of the tertiary amine include trimethylamine, triethylamine, tributylamine, ethyldiisopropylamine, etc. Examples of the quaternary ammonium ion of a quaternary ammonium salt include tetramethylammonium, triethylmethylammonium, tetraethylammonium, etc. By containing the second base component in the electrolytic solution, the electrolytic solution can be suppressed from becoming too low in pH.

It is preferable that the second base component is weakly alkaline (e.g., pH is less than or equal to 11 in aqueous solution).

The secondary base component may be a primary to tertiary amine compound having a hydroxyl group. Examples of the primary to tertiary amine compound having a hydroxyl group include an aliphatic primary to tertiary amine compound, etc., and in particular an aliphatic primary amine compound is more preferable. Examples of the aliphatic primary amine compound having a hydroxyl group include monomethanolamine, monoethanolamine, dihydroxymethylaminomethane, trishydroxymethylaminomethane, etc., which are weakly alkaline. From the viewpoint of suppressing corrosion of the anode body, an aliphatic primary amine compound having two or more hydroxyl groups is preferable, and an aliphatic primary amine compound having three or more hydroxyl groups is further preferable. As the aliphatic primary amine compound having three or more hydroxyl groups, trishydroxymethylaminomethane is preferable.

It is preferable that the pH of the electrolytic solution in the present exemplary embodiment ranges from 1.5 to 5.5, inclusive. By setting the pH to be less than or equal to 5.5, dedoping of a dopant from the conductive polymer is suppressed when the conductive polymer contains the dopant, so that an increase in ESR due to the dedoping of the dopant can be suppressed. Also, by setting the pH to be more than or equal to 1.5, corrosion of the anode body can be suppressed.

The pH of the electrolytic solution can be adjusted by adding the second basic component. It is preferable that the pH of the electrolytic solution to which the second basic component has been added ranges from 1.5 to 5.5, inclusive. By containing the second base component in the electrolytic solution, the electrolytic solution can be suppressed from becoming too low in pH. Further, when the aliphatic primary amine compound is used as the second base component, the electrolytic solution can be suppressed from becoming too high in pH.

The electrolytic solution may include a third acid component. It is preferable that the third acid component is a nitro compound. Examples of the nitro compound include a compound having a nitro group and a carboxyl group, a compound having a nitro group and a hydroxyl group, a compound having a nitro group and a hydroxyalkyl group, etc. Examples of the compound having a nitro group and a carboxyl group include, for example, o-nitrobenzoic acid, m-nitrobenzoic acid, p-nitrobenzoic acid, nitrobenzenedicarboxylic acid, dinitrobenzenecarb oxylic acid, nitrotoluenecarboxylic acid, nitroanisolecarboxylic acid, etc. Examples of the compound having a nitro group and a hydroxyl group include o-nitrophenol, m-nitrophenol, p-nitrophenol, p-nitroacetophenone, etc. Examples of the compound having a nitro group and a hydroxyalkyl group include o-nitrobenzyl alcohol, m-nitrobenzyl alcohol, p-nitrobenzyl alcohol, nitrobenzeneethanol, etc. By containing the third acid component in the electrolytic solution, decomposition of the first acid component can be further suppressed. It is preferable that a content proportion of an amount of the third acid component in the electrolytic solution ranges from 0.1 wt % to 15 wt %, inclusive. By setting it to be more than or equal to 0.1 wt %, decomposition of the first acid component can be further suppressed. By setting it to be less than or equal to 15 wt %, precipitation of the third acid component can be suppressed in the electrolytic solution. In particular, o-nitrobenzoic acid, m-nitrobenzoic acid, and p-nitrobenzoic acid are preferable as the third acid component, from the viewpoint of suppressing decomposition of the first acid component.

In the electrolytic capacitor of the present exemplary embodiment, the first acid component and the second acid component are contained. Hence, decomposition of the first acid component can be further suppressed, and the electrolytic solution is prevented from becoming too low in pH by the first basic component, even when self-heating occurs due to, for example, a ripple current while in use. Hence, deterioration of the electrolytic solution due to heat can be suppressed in the electrolytic capacitor of the present exemplary embodiment, and thus the recoverability of the dielectric layer can be maintained and an increase in a leakage current can be suppressed.

Hereinafter, an example of the method of producing the electrolytic capacitor according to the present exemplary embodiment will be described for each step.

(i) Step of Preparing Anode Body 21 Having Dielectric Layer

First, a metal foil that is a raw material of anode body 21 is prepared. The type of the metal is not particularly limited, but it is preferable to use a valve metal such as aluminum, tantalum, or niobium or an alloy containing the valve metal, from the viewpoint of easy formation of the dielectric layer.

Next, a surface of the metal foil is roughened. By the roughening, a plurality of irregularities are formed on the surface of the metal foil. It is preferable that the roughening is performed by etching the metal foil. The etching may be performed by, for example, a direct current electrolysis method or an alternating current electrolysis method.

Next, the dielectric layer is formed on the roughened surface of the metal foil. The forming method is not particularly limited, but the dielectric layer can be formed by subjecting the metal foil to an anodizing treatment. In the anodizing treatment, for example, the metal foil is immersed in an anodizing liquid such as an ammonium adipate solution, and is subjected to a heat treatment. Alternatively, the metal foil may be immersed in the anodizing liquid and a voltage may be applied.

From the viewpoint of mass productivity, a roughening treatment and the anodizing treatment are usually performed on a large-sized foil (metal foil) made of the valve metal or the like. In that case, anode body 21 is prepared by cutting the treated foil into a desired size.

(ii) Step of Preparing Cathode Body 22

A metal foil can be used for cathode body 22 similarly to the anode body. The type of the metal is not particularly limited, but it is preferable to use a valve metal such as aluminum, tantalum, or niobium or an alloy containing the valve metal. If necessary, a surface of cathode body 22 may be roughened. In addition, an oxide film anodized at about 2 V or a metal film made of titanium, nickel, or the like and/or a carbon film may be formed on the surface of cathode body 22.

(iii) Step of Forming Wound Body

Next, a wound body is formed by using anode body 21 and cathode body 22.

First, anode body 21 and cathode body 22 are wound while interposing separator 23 between them. At this time, lead tabs 15A, 15B can be erected from the wound body as shown in FIG. 2 by winding while rolling up lead tabs 15A, 15B.

As the material of separator 23, a non-woven fabric including, for example, natural cellulose, synthetic cellulose, polyethylene terephthalate, vinylon, aramid fiber, or the like as a main component can be used.

The material of lead tabs 15A, 15B is not particularly limited as long as it is a conductive material. The material of lead wires 14A, 14B, which are to be respectively connected to lead tabs 15A, 15B, are also not particularly limited as long as those are conductive material.

Next, fixing tape 24 is disposed on the outer surface of cathode body 22 located in the outermost layer of a wound body in which anode body 21, cathode body 22, and separator 23 are wound, and an end of cathode body 22 is fixed with fixing tape 24. When anode body 21 is formed by cutting the large-sized metal foil, the wound body may be further subjected to the anodizing treatment in order to form the dielectric layer on a cutting surface of anode body 21.

(iv) Step of Forming Capacitor Element 10

Next, a film including a conductive polymer which covers at least a part of the dielectric layer is formed by, for example, impregnating the dielectric layer with a polymer dispersion or a polymer solution. The polymer dispersion contains a liquid component and the conductive polymer dispersed in the liquid component. The polymer solution is a solution in which the conductive polymer is dissolved in a liquid component. Next, a dense solid electrolyte layer covering at least a part of the dielectric layer is formed by volatilizing the liquid component from the formed film by drying. Since the conductive polymer is uniformly distributed in the liquid component of the polymer dispersion, a uniform solid electrolyte layer can be easily formed by the polymer dispersion. In this way, capacitor element 10 can be obtained.

The polymer dispersion can be obtained by, for example, a method of dispersing a conductive polymer in a liquid component, a method of polymerizing a precursor monomer in a liquid component to generate the particles of a conductive polymer, or the like. An example of the preferred polymer dispersion includes, for example, poly(3,4-ethylenedioxythiophene) (PEDOT) doped with polystyrene sulfonic acid (PSS), that is, PEDOT/PSS.

The liquid component may be water, a mixture of water and a non-aqueous solvent, or a non-aqueous solvent. The non-aqueous solvent is not particularly limited, but for example, a protic solvent or an aprotic solvent can be used. Examples of the protic solvent include: alcohols such as methanol, ethanol, propanol, butanol, ethylene glycol, and propylene glycol; ethers such as formaldehyde and 1,4-dioxane; and the like. Examples of the aprotic solvent include: amides such as N-methylacetamide, N,N-dimethylformamide, and N-methyl-2-pyrrolidone; esters such as methyl acetate; ketones such as methyl ethyl ketone; and the like.

The step of providing the polymer dispersion to the surface of the dielectric layer and the step of drying the wound body may be repeated twice or more. By performing these steps multiple times, the coverage of the dielectric layer by the solid electrolyte layer can be increased. At this time, the solid electrolyte layer may be formed not only on the surface of the dielectric layer but also on the surfaces of cathode body 22 and separator 23.

From the above, the solid electrolyte layer is formed between anode body 21 and cathode body 22, so that capacitor element 10 is formed. The solid electrolyte layer formed on the surface of the dielectric layer substantially functions as a cathode material.

(v) Step of Preparing Electrolytic Solution and Impregnating Capacitor Element 10 with Electrolytic Solution Next, the above-described solute (acid component and base component) is dissolved in a solvent to prepare the electrolytic solution, and then capacitor element 10 is impregnated with the electrolytic solution. The method of impregnating capacitor element 10 with the electrolytic solution is not particularly limited. For example, a method of immersing capacitor element 10 in the electrolytic solution housed in a container is simple and preferable. The immersion time also depends on the size of capacitor element 10, but ranges, for example, from 1 second to 5 minutes. It is preferable that the impregnation is performed under reduced pressure, for example, in an atmosphere ranging from 10 kPa to 100 kPa, and preferably from 40 kPa to 100 kPa.

(vi) Step of Sealing Capacitor Element

Next, capacitor element 10 is sealed. Specifically, capacitor element 10 is first housed in bottomed case 11 such that lead wires 14A, 14B are located at a side of the open upper surface of bottomed case 11. As the material of bottomed case 11, a metal such as aluminum, stainless steel, copper, iron, or brass, or an alloy thereof can be used.

Next, sealing member 12 configured such that lead wires 14A, 14B penetrate sealing member 12 is disposed above capacitor element 10, so that capacitor element 10 is sealed in bottomed case 11. Next, the vicinity of the open end of bottomed case 11 is subjected to a lateral drawing, and the open end is curled to swage sealing member 12. Then, by disposing seat plate 13 on the curled portion, the electrolytic capacitor as shown in FIG. 1 is completed. Then, an aging treatment may be performed while the rated voltage is being applied.

Although the winding-type electrolytic capacitor has been described in the above exemplary embodiment, the scope of application of the present disclosure is not limited to the above. The present disclosure can be applied to other electrolytic capacitors including, for example, a chip-type electrolytic capacitor using a sintered metal body as an anode body and a laminated-type electrolytic capacitor using a metal plate as an anode body.

Examples

The present disclosure will be described in more detail based on examples, but the present disclosure is not limited to the examples.

In the following examples, a winding-type electrolytic capacitor (φ (diameter) 10 mm×L (length) 10 mm) having a rated voltage of 25 V and a rated electrostatic capacity of 330 μF was produced. A specific method of producing the electrolytic capacitor will be described below.

Preparation of Anode Body

An aluminum foil having a thickness of 100 μm was subjected to an etching treatment to roughen the surface of the aluminum foil. Then, a dielectric layer was formed on the surface of the aluminum foil by an anodizing treatment. The anodizing treatment was performed by immersing the aluminum foil in an ammonium adipate solution and applying a voltage of 50 V to the aluminum foil. Then, the aluminum foil was cut to prepare an anode body.

Preparation of Cathode Body

An aluminum foil having a thickness of 50 μm was subjected to an etching treatment to roughen the surface of the aluminum foil. Then, the aluminum foil was cut to prepare a cathode body.

Production of Wound Body

An anode lead tab and a cathode lead tab were connected to the anode body and the cathode body, respectively, and the anode body and the cathode body were wound interposing a cellulose separator while the lead tabs were being rolled up. An anode lead wire and a cathode lead wire were connected to the ends of the lead tabs protruding from the wound body, respectively. The formed wound body was subjected to an anodizing treatment again to form a dielectric layer on the cutting end of the anode body. Next, the end of the outer surface of the wound body was fixed with a fixing tape to produce a wound body.

Preparation of Polymer Dispersion

A mixed solution was prepared by dissolving, in ion-exchanged water, 3,4-ethylenedioxythiophene and polystyrene sulfonic acid (PSS, weight average molecular weight 100,000) that is a polymer dopant. While the mixed solution was stirred, iron(III) sulfate (oxidant) dissolved in ion-exchanged water was added to perform a polymerization reaction. After the reaction, the obtained reaction solution was dialyzed to remove the unreacted monomer and excess oxidant, so that a polymer dispersion containing polyethylenedioxythiophene doped with about 5% by mass of PSS (PEDOT/PSS) was obtained.

Formation of Solid Electrolyte Layer

The wound body was immersed in the polymer dispersion housed in a container for 5 minutes in a reduced pressure atmosphere (40 kPa), and then the wound body was pulled out from the polymer dispersion. Next, the wound body impregnated with the polymer dispersion was dried in a drying oven at 150° C. for 20 minutes to form a solid electrolyte layer constituted by a conductive polymer layer covering at least a part of the dielectric layer.

Impregnation With Electrolytic Solution

An electrolytic solution containing a first acid component, a first base component, a second acid component, a second base component, and various solvents, which are in the composition shown in Table 1, was prepared, and the wound body was immersed in the electrolytic solution for 5 minutes in a reduced pressure atmosphere (40 kPa). The numerical values in Table 1 indicate the content proportions (unit:wt %) of the respective components in the electrolytic solution.

TABLE 1

| | First base component/ First acid component | Solvent | | | | Second acid component | | Third acid component | Second base component |
|---|---|---|---|---|---|---|---|---|---|
| | TMI/BSA | GBL | EG | SL | PEG 300 | BA | PA | PNA | THAM |
| Example 1 | 5 | 55 | — | 12 | 25 | 3 | — | — | — |
| Example 2 | 10 | 50 | — | 12 | 25 | 3 | — | — | — |
| Example 3 | 15 | 45 | — | 12 | 25 | 3 | — | — | — |
| Example 4 | 30 | 30 | — | 12 | 25 | 3 | — | — | — |
| Example 5 | 15 | — | 45 | 12 | 25 | 3 | — | — | — |
| Example 6 | 15 | 45 | — | 12 | 25 | — | 3 | — | — |
| Example 7 | 15 | 44 | — | 12 | 25 | 3 | 1 | — | — |
| Example 8 | 15 | 45 | — | 12 | 25 | 3 | — | — | 1 |
| Example 9 | 15 | 45 | — | 12 | 25 | 3 | — | 1 | — |
| Comparative Example 1 | 15 | 48 | — | 12 | 25 | — | — | — | — |
| Comparative Example 2 | 25 | — | 30 | 20 | 25 | — | — | — | — |

TMI/BSA: 1,2,3,4-Tetramethylimidazolinium/Borodisalicylic acid
GBL: γ-Butyrolactone
EG: Ethylene glycol
SL: Sulfolane
PEG 300: Polyethylene glycol having weight average molecular weight of 300
BA: Boric acid
PA: Phosphoric acid
PNA: p-Nitrobenzoic acid
THAM: Trishydroxymethylaminomethane Sealing of Capacitor Element A capacitor element impregnated with the electrolytic solution was sealed to complete the electrolytic capacitors as shown in FIG. 1 (Examples 1 to 9 and Comparative examples 1 and 2). Then, an aging treatment was performed at 130° C. for 2 hours, while the rated voltage was being applied.

Evaluation

Initial leakage current X0 (LC) and initial equivalent series resistance Y0 (ESR) of the obtained electrolytic capacitor were measured.

Next, in order to evaluate long-term reliability, a rate of change in leakage current (ΔLC) and a rate of change in ESR (ΔESR) were evaluated by holding the electrolytic capacitor at 145° C. for 4,000 hours while the rated voltage was being applied.

ΔLC was shown by the ratio (X/X0) of LC (X) that is a value after the holding at 145° C. to the initial value (X0).

As the leakage current, a leakage current was measured in a condition in which a voltage of 25 V was applied between the anode body and the cathode body of the electrolytic capacitor for 120 seconds at room temperature.

ΔESR was shown by the ratio (Y/Y0) of ESR (Y) that is a value after the holding at 145° C. to the initial value (Y0). ESR of the electrolytic capacitor was measured using an LCR meter at a frequency of 100 kHz at room temperature.

Table 2 shows evaluation results.

TABLE 2

| | Leakage current (LC) measurement | | | Equivalent series resistance (ESR) measurement | | |
|---|---|---|---|---|---|---|
| | Initial Xo[μA] | After load X[μA] | ΔLC X/Xo | Initial Yo[mΩ] | After load Y[mΩ] | ΔESR Y/Y |
| Example 1 | 4.2 | 4.3 | 1.02 | 11.0 | 16.3 | 1.48 |
| Example 2 | 4.1 | 4.2 | 1.02 | 11.4 | 17.1 | 1.50 |
| Example 3 | 3.8 | 3.7 | 0.97 | 11.8 | 18.9 | 1.60 |
| Example 4 | 3.5 | 3.2 | 0.91 | 12.1 | 23.0 | 1.90 |
| Example 5 | 3.9 | 3.8 | 0.97 | 10.8 | 15.1 | 1.40 |
| Example 6 | 3.4 | 3.9 | 1.15 | 11.0 | 15.4 | 1.40 |
| Example 7 | 3.8 | 3.9 | 1.03 | 10.8 | 14.0 | 1.30 |
| Example 8 | 3.2 | 2.3 | 0.72 | 12.1 | 20.6 | 1.70 |
| Example 9 | 3.4 | 3.2 | 0.94 | 10.5 | 13.7 | 1.30 |
| Comparative Example 1 | 3.8 | 11.5 | 3.03 | 12.5 | 31.3 | 2.50 |
| Comparative Example 2 | 3.9 | 12.9 | 3.31 | 11.3 | 24.9 | 2.20 |

In each of Examples 1 to 9, the reliability of the electrolytic capacitor was able to be enhanced as compared with that in each of Comparative examples 1 and 2.

The present disclosure can be used in an electrolytic capacitor including both a solid electrolyte layer covering at least a part of a dielectric layer and an electrolytic solution.

What is claimed is:

1. An electrolytic capacitor comprising:
   an anode body having a dielectric layer disposed on a surface of the anode body;
   a solid electrolyte layer that is in contact with the dielectric layer, the solid electrolyte layer including a conductive polymer; and
   an electrolytic solution, wherein:
   the electrolytic solution contains a solvent, a first base component, a second base component, a first acid component, and a second acid component,
   the solvent includes a glycol compound,
   the first base component includes an amidine compound,
   the second base component includes a primary amine compound,
   the first acid component includes a composite compound of an inorganic acid and an organic acid,
   the second acid component includes at least one selected from a group consisting of boric acid, phosphoric acid, phosphorous acid, hypophosphorous acid, and phosphonic acid,
   a content proportion of a total amount of the first base component and the first acid component in the electrolytic solution ranges from 5 wt % to 30 wt %, inclusive, and
   a pH of the electrolytic solution ranges from 1.5 to 5.5, inclusive.

2. The electrolytic capacitor according to claim 1, wherein a weight average molecular weight of the glycol compound is less than or equal to 300.

3. The electrolytic capacitor according to claim 1, wherein the first acid component includes at least one selected from a group consisting of borodisalicylic acid, borodiglycolic acid, and borodioxalic acid.

4. The electrolytic capacitor according to claim 1, wherein a content proportion of the second acid component in the electrolytic solution ranges from 0.1 wt % to 15 wt %, inclusive.

5. The electrolytic capacitor according to claim 1, wherein the second acid component is boric acid.

6. The electrolytic capacitor according to claim 1, wherein:
   the primary amine compound is an aliphatic primary amine compound having a hydroxyl group.

7. The electrolytic capacitor according to claim 6, wherein the aliphatic primary amine compound having a hydroxyl group has three or more hydroxyl groups.

8. An electrolytic capacitor comprising:
   an anode body having a dielectric layer disposed on a surface of the anode body;
   a solid electrolyte layer that is in contact with the dielectric layer, the solid electrolyte layer including a conductive polymer; and
   an electrolytic solution, wherein:
   the electrolytic solution contains a first base component, a second base component, a first acid component, a second acid component, and a third acid component,
   the first base component includes an amidine compound,
   the second base component includes a primary amine compound,
   the first acid component includes a composite compound of an inorganic acid and an organic acid,
   the second acid component includes at least one selected from a group consisting of boric acid, phosphoric acid, phosphorous acid, hypophosphorous acid, and phosphonic acid,
   the third acid component includes a nitro compound,
   a content proportion of a total amount of the first base component and the first acid component in the electrolytic solution ranges from 5 wt % to 30 wt %, inclusive, and
   a pH of the electrolytic solution ranges from 1.5 to 5.5, inclusive.

9. The electrolytic capacitor according to claim 8, wherein the first acid component includes at least one selected from a group consisting of borodisalicylic acid, borodiglycolic acid, and borodioxalic acid.

10. The electrolytic capacitor according to claim 8, wherein a content proportion of the second acid component in the electrolytic solution ranges from 0.1 wt % to 15 wt %, inclusive.

11. The electrolytic capacitor according to claim 8, wherein the second acid component is boric acid.

12. The electrolytic capacitor according to claim 8, wherein:
   the primary amine compound is an aliphatic primary amine compound having a hydroxyl group.

13. The electrolytic capacitor according to claim 12, wherein the aliphatic primary amine compound having a hydroxyl group has three or more hydroxyl groups.

14. The electrolytic capacitor according to claim 8, wherein:
   the electrolytic solution contains a solvent, and
   the solvent includes a glycol compound.

15. The electrolytic capacitor according to claim 14, wherein a weight average molecular weight of the glycol compound is less than or equal to 300.

* * * * *